(12) United States Patent
Gilra et al.

(10) Patent No.: US 9,898,173 B2
(45) Date of Patent: Feb. 20, 2018

(54) USER SELECTION HISTORY

(75) Inventors: Anant Gilra, Bangalore (IN); Eugene L. Jude, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 2209 days.

(21) Appl. No.: 12/247,103

(22) Filed: Oct. 7, 2008

(65) Prior Publication Data

US 2014/0250411 A1    Sep. 4, 2014

(51) Int. Cl.
    G06F 3/0484    (2013.01)

(52) U.S. Cl.
    CPC ................................ G06F 3/04842 (2013.01)

(58) Field of Classification Search
    CPC .................................................. G06F 3/04842
    USPC ............................ 715/811, 704; 707/683, 684
    See application file for complete search history.

(56) References Cited

U.S. PATENT DOCUMENTS

| 5,659,747 | A | * | 8/1997 | Nakajima | 713/1 |
| 5,692,143 | A | * | 11/1997 | Johnson et al. | 715/764 |
| 5,933,829 | A | | 8/1999 | Durst et al. | |
| 5,978,773 | A | | 11/1999 | Hudetz et al. | |
| 6,081,827 | A | | 6/2000 | Reber et al. | |
| 6,199,048 | B1 | | 3/2001 | Hudetz et al. | |
| 6,377,964 | B1 | * | 4/2002 | Sano | 715/205 |
| 7,062,497 | B2 | * | 6/2006 | Hamburg et al. | |
| 2002/0109680 | A1 | * | 8/2002 | Orbanes et al. | 345/418 |
| 2002/0140736 | A1 | * | 10/2002 | Chen | 345/777 |
| 2005/0125743 | A1 | * | 6/2005 | Beaton et al. | 715/811 |
| 2008/0109717 | A1 | * | 5/2008 | Krauter | 715/255 |
| 2010/0013843 | A1 | * | 1/2010 | Ameline | 345/522 |

OTHER PUBLICATIONS

Kurlander, D.; Feiner, S.; , "Editable graphical histories," Visual Languages, 1988., IEEE Workshop on , vol., No., pp. 127-134, Oct. 10-12, 1988.*
Thomas Berlage and Andreas Genau. 1993. From Undo to Multi-User Applications. In Proceedings of the Vienna Conference on Human Computer Interaction (VCHCI '93), Thomas Grechenig and Manfred Tscheligi (Eds.). Springer-Verlag, London, UK, 213-224.*

* cited by examiner

Primary Examiner — Andrea Long
(74) Attorney, Agent, or Firm — Kilpatrick Townsend & Stockton LLP

(57) ABSTRACT

Traversal of selections within a productivity application is described. When a user indicates a traversal signal, an ordered list of user selections is searched for a next selection entry in the ordered list. Object information from the next selection entry is obtained, wherein the object information describes a position and content of an object in a user interface of the productivity application. Using this object information, a current selection in the user interface is changed to the object corresponding to the next selection entry without changing the order of the list. Any action other than simple traversal taken by the user on an object will change the content and order of the list.

18 Claims, 21 Drawing Sheets

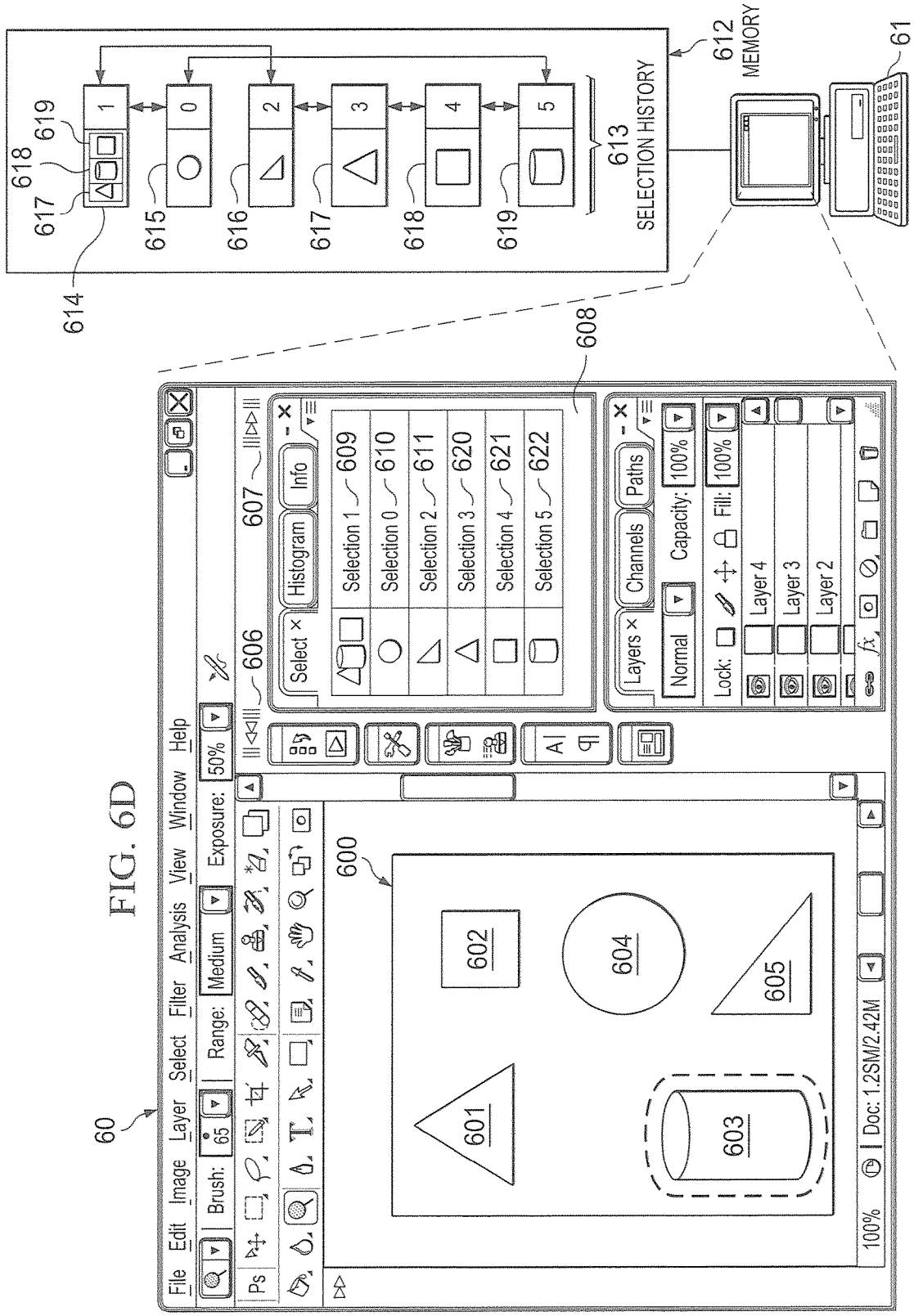

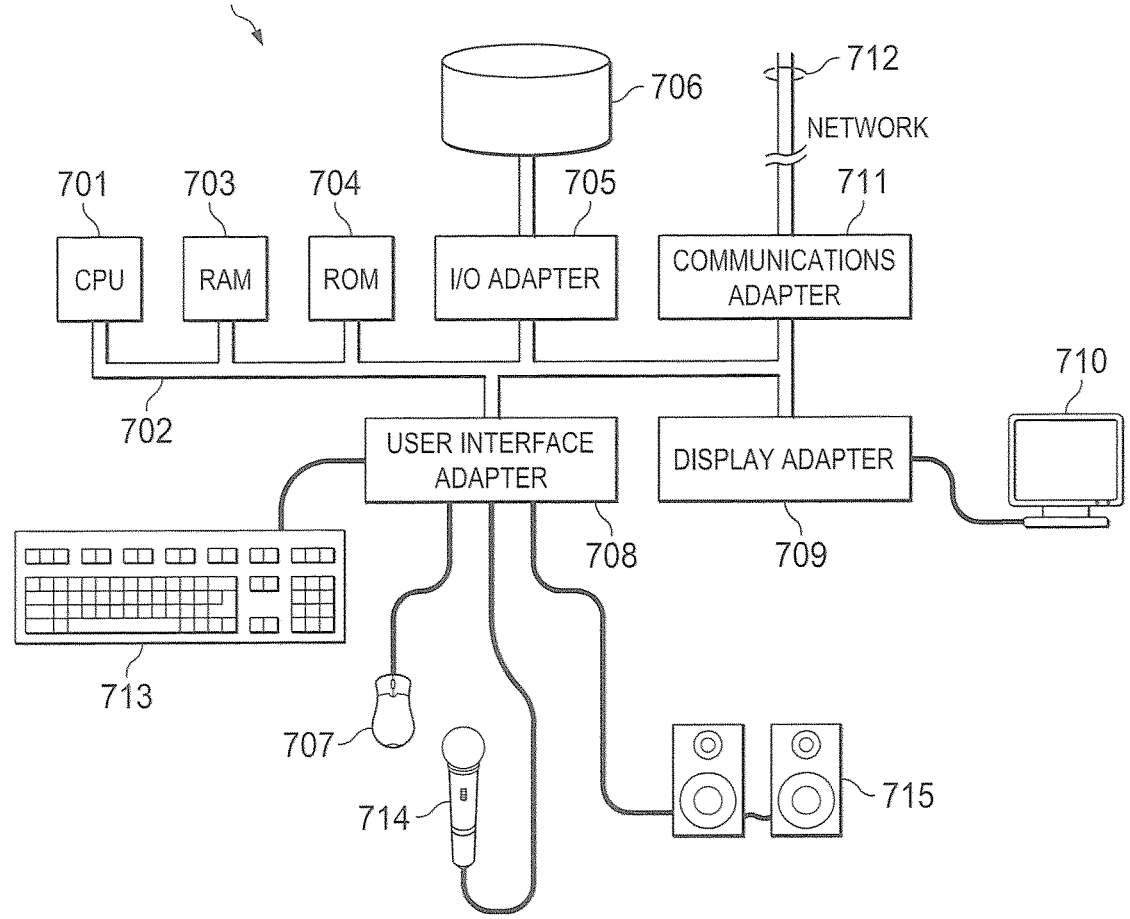

USER SELECTION HISTORY

TECHNICAL FIELD

The present teachings relates, in general, to computer productivity applications, and, more particularly, to a traversable user selection history.

BACKGROUND

Computers and computer applications form the central tools for productivity in the modern computer age. Productivity applications include such applications as word processors, spreadsheet programs, graphics design development environment, web design environments, application development environments, and the like. One common thread to these various productivity applications is that they typically accept input from a user who is developing, designing, or writing some piece of work product.

With the advent of graphical user interfaces (GUIs) and pointing devices, users have generally been allowed to exert a more free control over the design canvas in productivity applications. Users may select text, graphics, images, screen locations, and the like in order to work with or edit a particular piece of the work product. One feature that has been developed to make editing more efficient is the undo feature. Undo, which typically also includes its complement "redo", is the feature that stores up to a certain number of consecutive edit signals that have been applied to a particular piece of work. In general, undo/redo employs a last in, first out (LIFO) standard for maintaining edits in its allotted memory. If a user desires to cancel or go back to a previous version of the work piece, he or she may step through the undo stack, i.e., the storage data structure that maintains the previous states of the work piece, undoing each consecutive edit that the user has made. The complementary redo stack stores the undone edits so that the user, if he or she steps back too far in the undo stack, may easily redo the edits in the same sequence. Once the user performs a new edit, the undo stack begins storing the edits from that newly edited point. The previous edits in the stack before the new edit still remain; however, a new sequence of edits begin.

As work projects become larger and more complex, users will often spend a considerable amount of time and effort moving between various locations in the document or between various objects in the document. Additionally, many graphics-related productivity applications include layering features or timelines that add another layer of complexity to traversing various portions or objects within a document. For example, a single graphics page may contain hundreds or even thousands of layers stacked on top of one another. Layers may also be hierarchically arranged, furthering the difficulty in selecting one from another. Each layer may have its own object or feature or other item that the user/developer may need to work with in the development of the project. It is very tedious to move back and forth between layers and between objects within a layer. Developers will typically use a layers panel to select from, as it may be difficult or even impossible to accurately select a particular layer using a pointing device with a sub-selection tool on the design view canvas of the application.

Moreover, with a large number of layers or a timeline that is very long, it may take a considerable amount of physical manipulation of the pointing device to move between selections even in the layers panels or timeline representations. The undo/redo feature does nothing to assist the user/developer in moving between the various portions of the document, layers or time frames. Its job is merely to step through and undo or then redo a particular sequential edit. Therefore, the user/developer is left to the tedious tasks of moving between these sometimes numerous layers and frames of a timeline or scrolling between portions of a document.

BRIEF SUMMARY

The present disclosure is directed to a methods and computer program products that allow productivity application users to traverse through a sequence of selections maintained in an ordered selection history list. As the user either creates, selects, or edits objects on the workspace of the productivity application, the selection history list stores object information about the object the user is interacting with and a sequence indicator which corresponds to the order in which the user interacts with the objects. The various selection entries in the selection history list are linked together such that when the user activates some kind of traversal signal, such as a key sequence or interface button, the current selection on the workspace is changed to the next object, whether the next object is the one before or after the current selection, depending on the direction the user decides to go. The user may freely traverse the list without changing the order of the list. However, if any action is performed on the selected object, such as manually selecting the object, moving it, or editing it in some way, the list will change to reflect whatever action is performed on the object and the sequence indicator will be changed to reflect that this modified object is in the first position of the list.

Additional representative embodiments are directed to methods that include receiving traversal input at a productivity application, searching, in response to receiving the traversal input, an ordered list of user selections for a next selection entry in the ordered list, obtaining object information from the next selection entry, wherein the object information describes a position and content of an object in a user interface of the productivity application, and changing a current selection in the user interface to the object corresponding to the next selection entry.

Further representative embodiments are directed to methods that include detecting a user selection associated with an object on an interface of a productivity application, storing a selection entry in a selection history list, wherein the selection history list comprises two or more user selection actions arranged according to a use selection sequence. Each selection entry is made up of object information associated with the object and a selection indicator identifying an order of the selection entry in the selection history list. The methods also include setting the selection indicator associated with the detected user selection action to a new current selection, re-ordering the selection indicator associated with other entries in the ordered list to a new order of the selection history list, examining the selection indicator, in response to receiving traversal input, to determine a next adjacent selection entry, and modifying the interface, in response to finding the next adjacent selection entry, to reflect selection of the next object, where the modification uses next object information of the next object associated with the next adjacent selection entry and wherein the modifying does not change the selection history list.

Still further representative embodiments are directed to computer program products having computer readable media with computer program logic recorded thereon. The computer program product includes code for receiving traversal input at a productivity application, code, executed in response to the traversal input, for searching an ordered list of user selections for a next selection entry in the ordered list, code for obtaining object information from the next selection entry, wherein the object information describes a position and content of an object in a user interface of the productivity application, and code for changing a current selection in the user interface to the object corresponding to the next selection entry.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present teaching. It should also be realized by those skilled in the art that such equivalent constructions do not depart from the spirit and scope of the teachings as set forth in the appended claims. The novel features which are believed to be characteristic of the disclosure both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teaching.

BRIEF DESCRIPTION OF THE DRAWINGS

For a more complete understanding of the present disclosure, reference is now made to the following descriptions taken in conjunction with the accompanying drawing, in which:

FIGS. 6A-D are diagrams illustrating a graphical productivity application configured according to one embodiment of the present disclosure; and FIG. 7 illustrates an exemplary computer system configured to implement one embodiment of the present disclosure.

DETAILED DESCRIPTION

Figure 1:
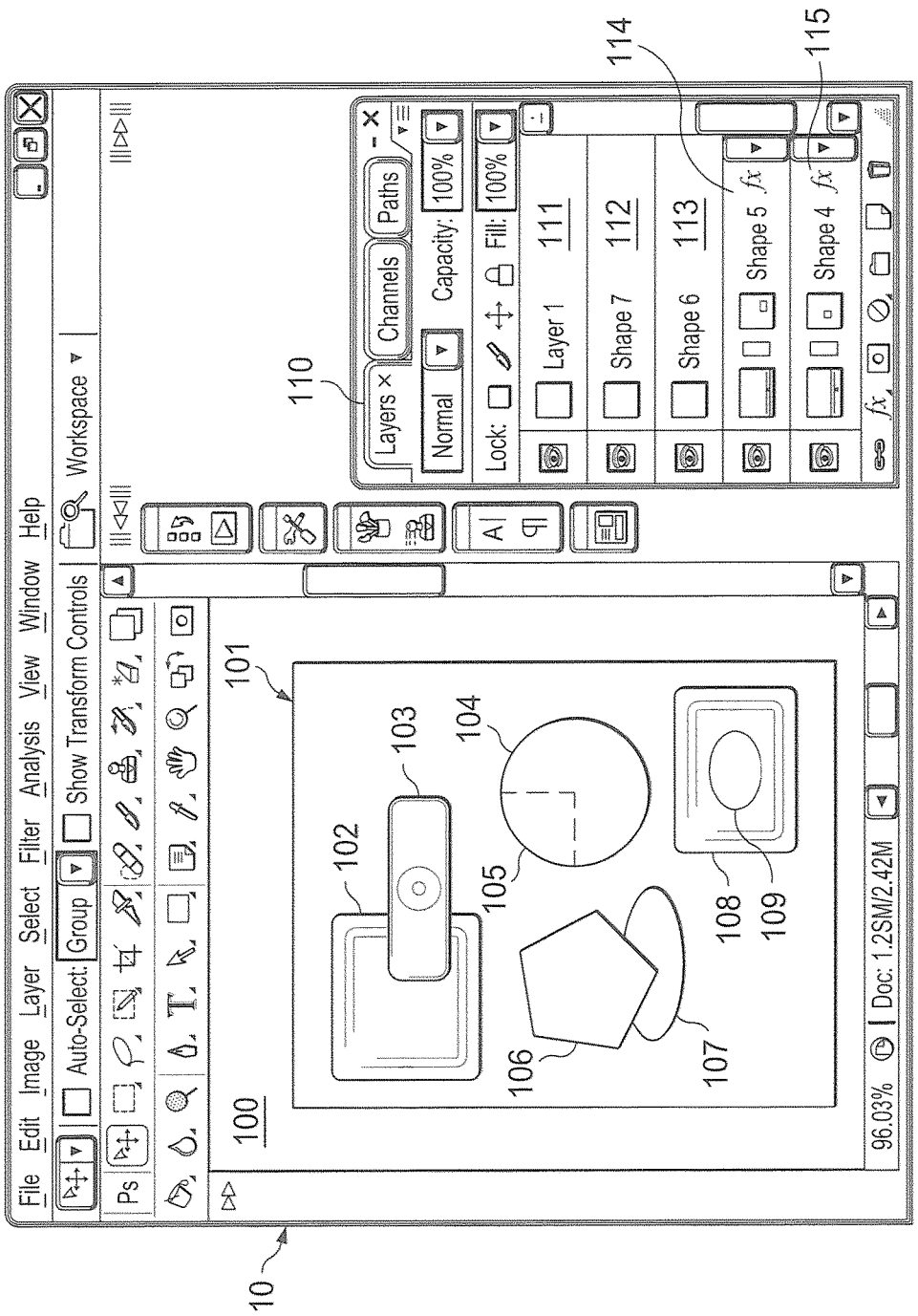
FIG. 1 is a screen shot illustrating graphical productivity application (GPA)

In operating with various productivity applications, users will generally move back and forth between different locations within a document, different layers within the document, different layers and frames within a timeline and the like. FIG. 1 is a screen shot illustrating graphical productivity application (GPA) 10. GPA 10 operates within a computer environment (not shown) and is displayed to a designer or developer on a computer display (not shown). GPA 10 provides design canvas 100 in which developers or designers may create various graphical-related objects, such as objects 102-109, within document 101. Each of these objects has also been created in its own layer within document 101. Layers panel 110 provides a graphical user interface (GUI) that displays information regarding each layer in document 101 as well as an indication of which layer is the current selection. These indications are illustrated as layer entries 111-115. Developers generally use layers panel 110 to select between the multiple layers that exist on any give document, such as document 101.

It should be noted that other means are used by developers to select between layers, such as by using a sub-selection tool to manually select the desired layer from the design canvas.

FIGS. 2A-2J are block diagrams illustrating GPA 20 configured according to one embodiment of the present disclosure. The figures illustrate a progression in the design or development process of document 200 and how GPA 20 provides the ability to record the designer's selection sequence and subsequent traversal of the selection history, as maintained in selection history 207. GPA 20 operates within computer environment 22 that includes memory 206. A designer works on document 200 on design canvas 21 to create desired graphical elements. As illustrated, the designer has created objects 201-204 within document 200. GPA 20 maintains selection history 207 which keeps track of the selection history of the designer. The information maintained in selection history 207 includes the object information for the particular object associated with the selection. Depending on the application being used and the object selected, object information includes the object itself, the position of the object within the document, if the document uses layers, the particular layer in which the object resides, if the document uses a timeline with frames, the particular frame in which the document resides, and any other information, such as page number, paragraph number, or the like, that indicates the location of the object within the document.

In the illustrated example, as the developer has created each of objects 201-204, an entry of corresponding object information is added to selection history 207 and linked to the previous selection. For example, the developer created object 201 first, followed by object 202, then object 203, and finally object 204. This creation sequence generated selection entries 208-211 within selection history 207 that includes the object information for its corresponding one of objects 201-204. Selection entries 208-211 are illustrated in FIGS. 2A-2J with the representative object (which represents the entry of object information) and a sequence indicator to indicate the current selection and any previous selections within selection history 207. The current selection is identified with the sequence indicator '0'. As indicated in selection entry 208, object 204 is currently selected in document 200. The dotted line surrounding object 204 is provided to indicate which object in document 200 is selected. In actual operation, there may be any number of other indicators to show the designer which object is selected.

Figure 2A:
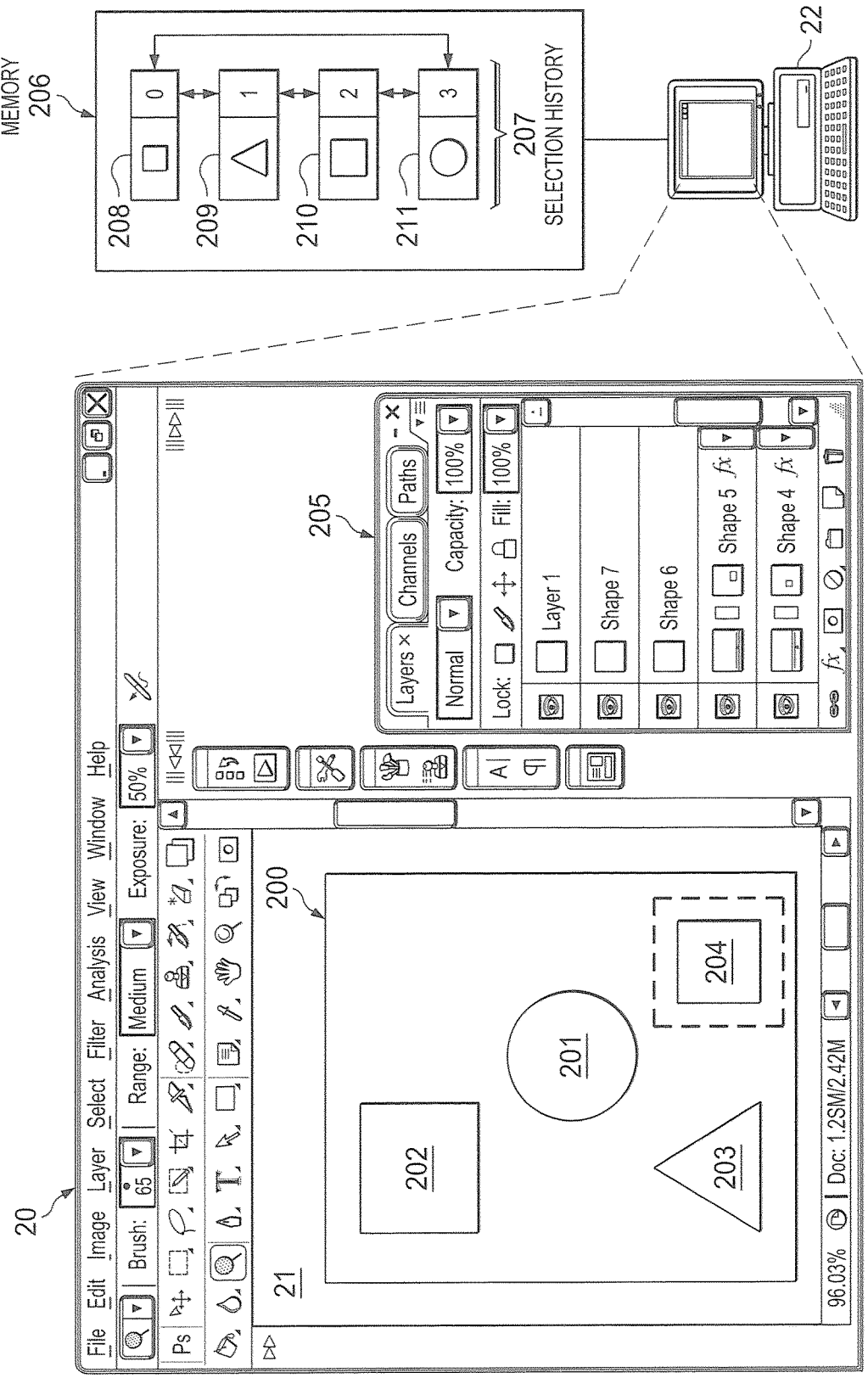
FIGS. 2A-2K are block diagrams illustrating graphical productivity application configured according to one embodiment of the present disclosure.

It should be noted that the example embodiment of selection history 207 illustrated in FIG. 2A is merely a block diagram representation of a software data structure. The actual functionality of this data structure may be implemented through any number of known techniques, such as arrays, linked lists, stacks, or the like. Implementation of selection history 207 is shown using a circular linked list.

It should further be noted that while the examples described herein use numbers to represent sequence indicators, in practice, a sequence indicator may be anything that enables a processor or application to determine a sequence within the data structure.

Figure 2B:
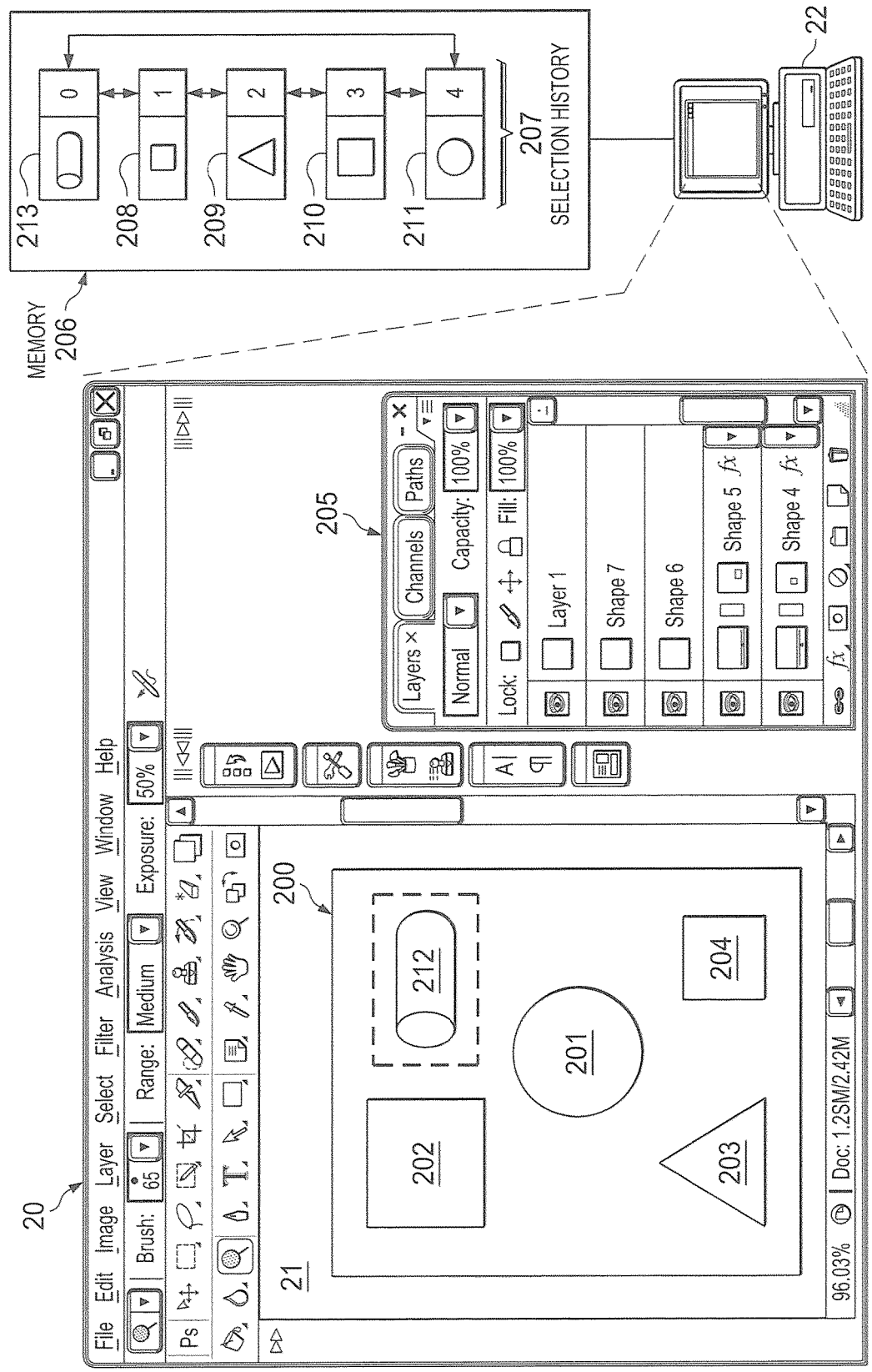

In FIG. 2B, the designer creates object 212 in document 200. The dotted line surrounding object 212 indicates that it is the currently-selected document. By adding object 212 to document 200, selection entry 213 is also added with the object information relating to object 212 to selection history 207 in memory 206. Because it is currently selected, its sequence indicator is entered as '0', while the sequence indicators of the remaining selection entries 208-211 are re-ordered to reflect the change in sequence. For example, the selection entry previously set to sequence indicator '0' (i.e., selection entry 208, with its object information relating to object 201) is changed to sequence indicator '1', the selection entry previously set to sequence indicator '1' (i.e., selection entry 209) is changed to sequence indicator '2', and so on. The links are also updated to reflect the new order with the last selection entry, selection entry 211, being linked now to the current selection, selection entry 213.

It should be noted that in additional and/or alternative embodiments in which selection history 207 is implemented using an array, each element in the array would be rearranged to change the order of the list. If vectors are used, which would be similar to the linked list shown, a node is added at the start of the vector which is set to the current selection.

Figure 2C:
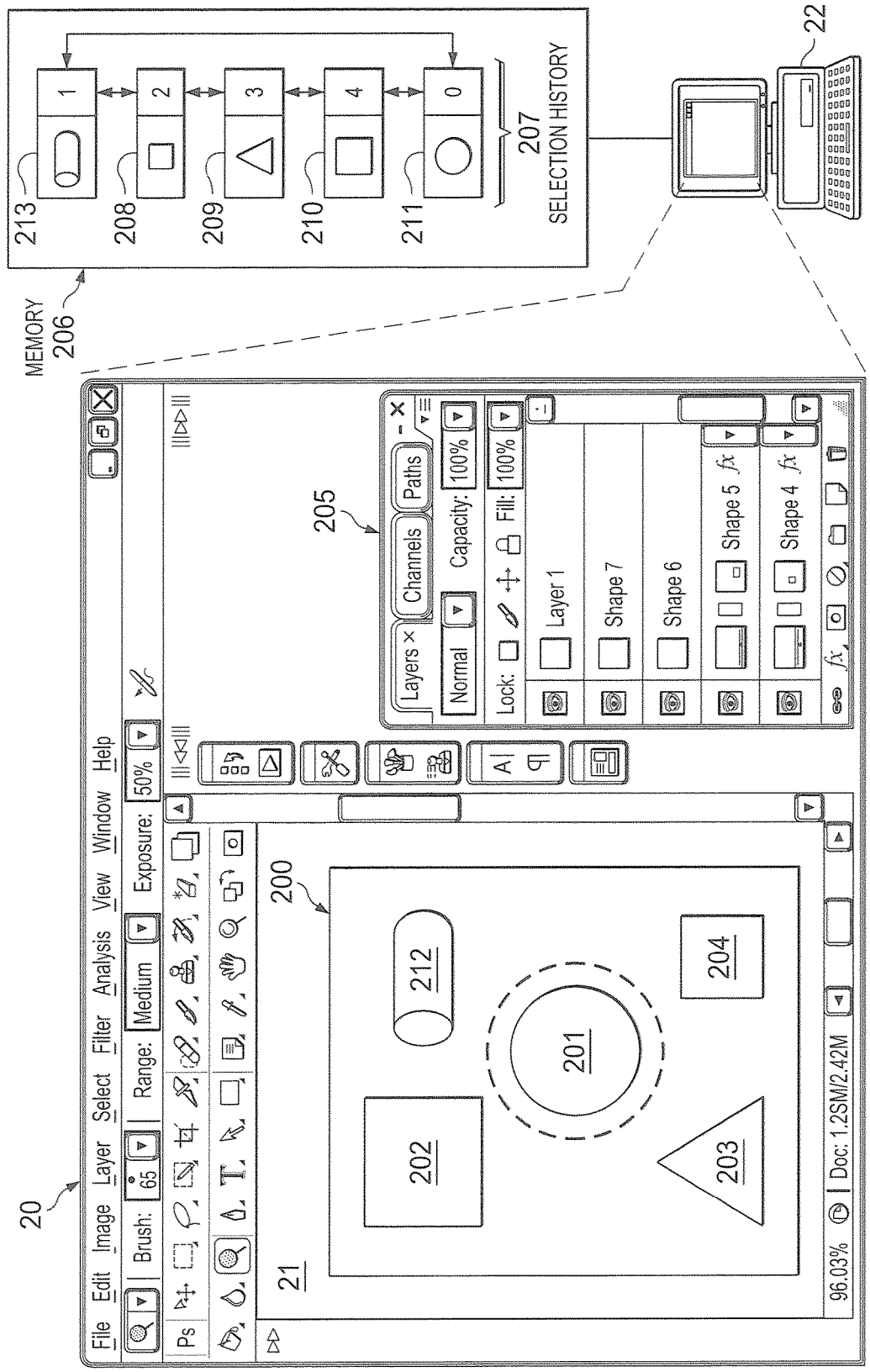

In FIG. 2C, the designer moves his or her selection back to object 201. The designer does not perform any editing or transformation actions to object 201, but merely changes the currently selected object to object 201 using a selection sub-selection tool or other pointing tool. In response to the designer changing selection, the current selection sequence indicator '0' is written to selection entry 211 of selection history 207. Entry selection 211 includes the object information that corresponds to object 201. Selection history 207 then updates the sequence indicators for the other selection entries 208-210 and 213 and rearranges the links to reflect the new selection sequence.

Figure 2D:
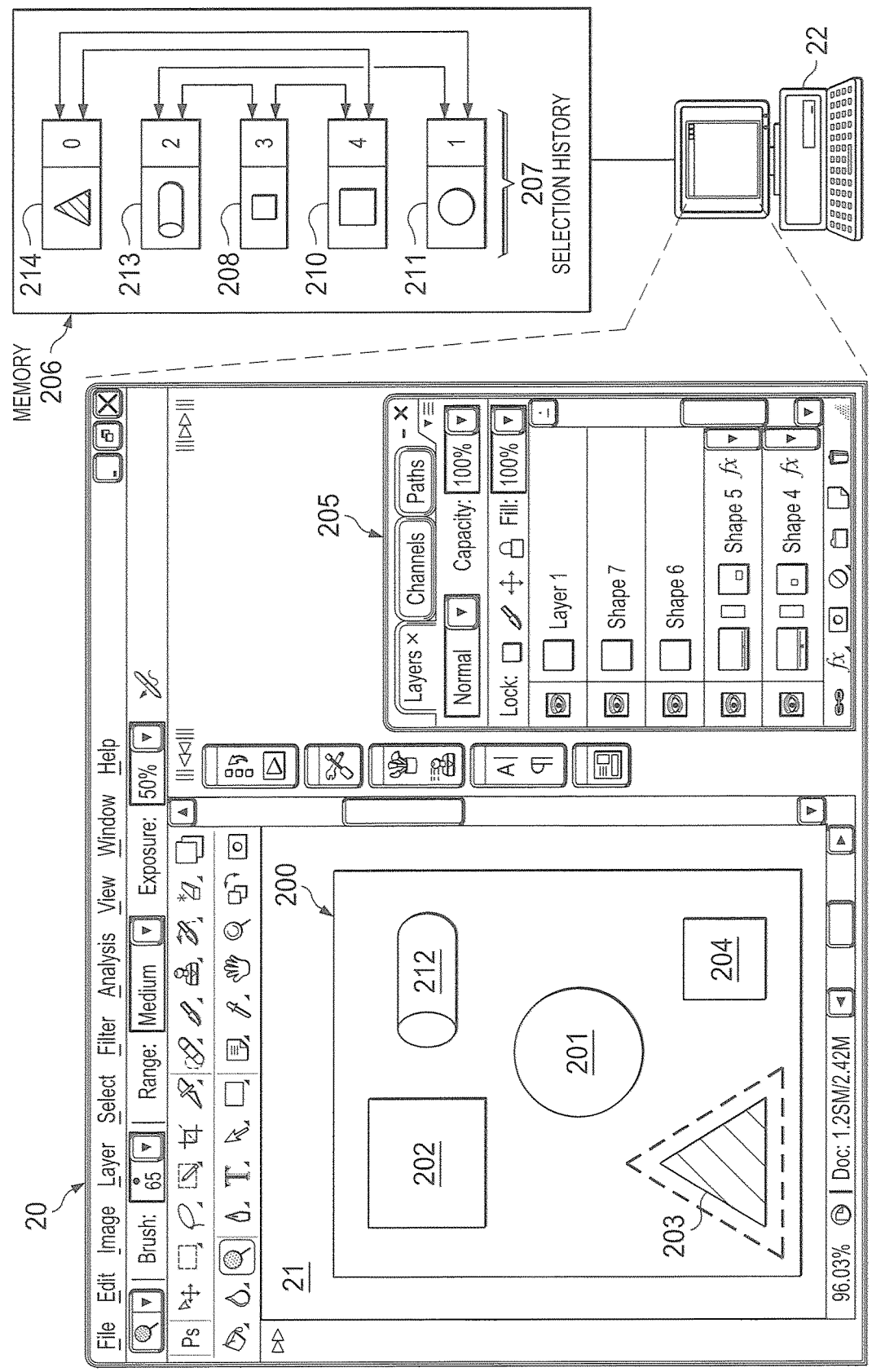

At the point in the design process illustrated in FIG. 2D, the designer selects object 203 and changes its color using functionality of GPA 20. Because of this modification to object 203, selection history 207 deletes selection entry 209 (FIG. 2C), which corresponded to the original version of object 203, and adds selection entry 214 along with the new object information corresponding to the newly modified version of object 203. As the new current selection, selection history 207 writes sequence indicator '0' to selection entry 214, which changes the linking of selection history 207 to reflect the new sequence.

Figure 2E:
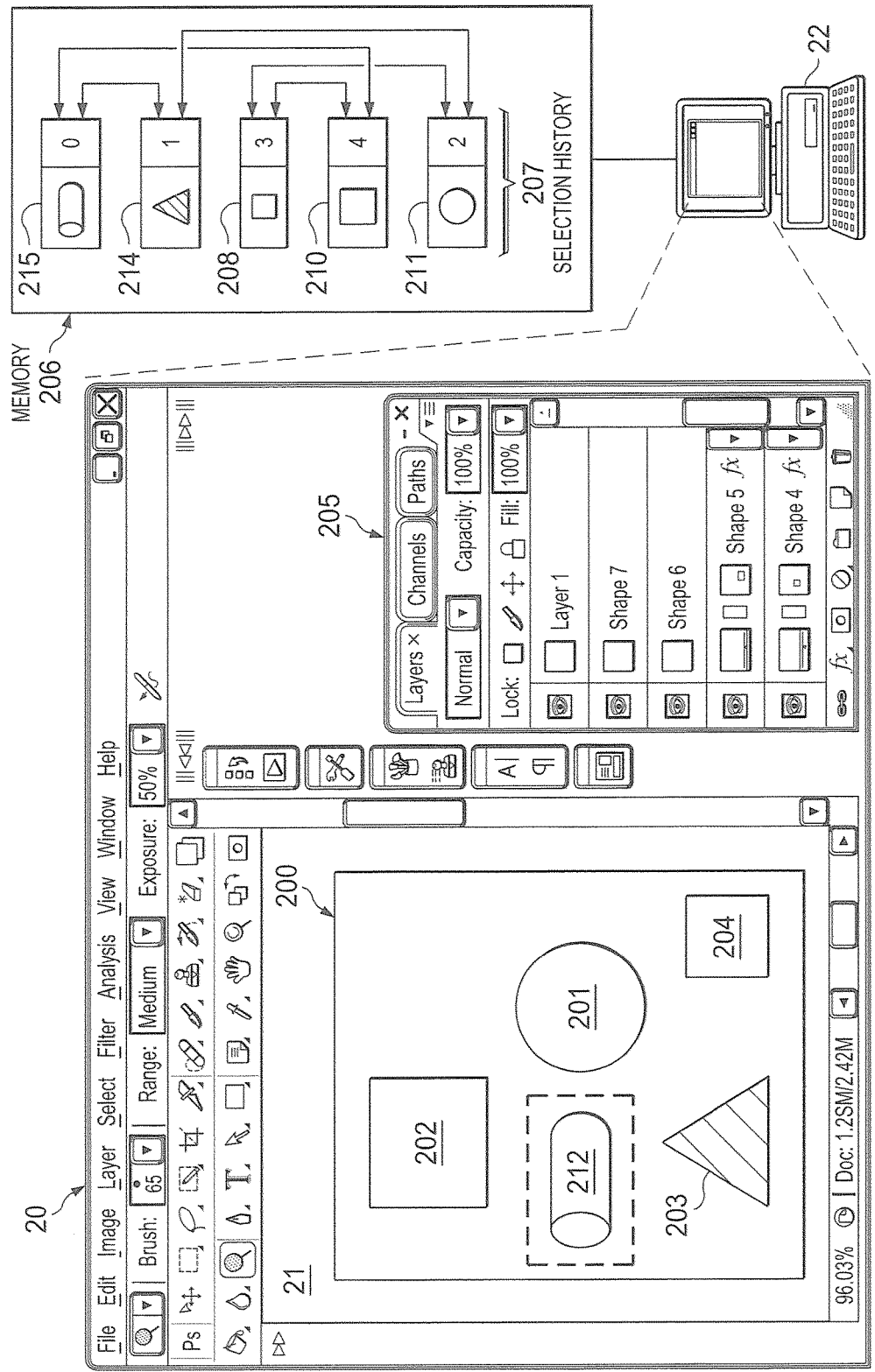

In FIG. 2E, the designer selects and transforms object 212 by moving within document 200. In response to the repositioning of object 212, selection history 207 deletes selection entry 213 and adds new selection entry 215, which includes the object information reflecting the new positional information for object 212. Selection history 207 writes the current selection sequence indicator '0' to selection entry 215 and adjusts the sequence indicators for selection entries 208-211 and 214 to reflect the new selection sequence.

It should be noted that transformations are actions applied to objects in various development environments to modify the position or appearance of the object. For example, transformations include such actions as movement, scaling, rotation, skewing, warping, and the like. Editing signals, in comparison, are generally applied by users to modify the construction of the object itself.

Figure 2F:
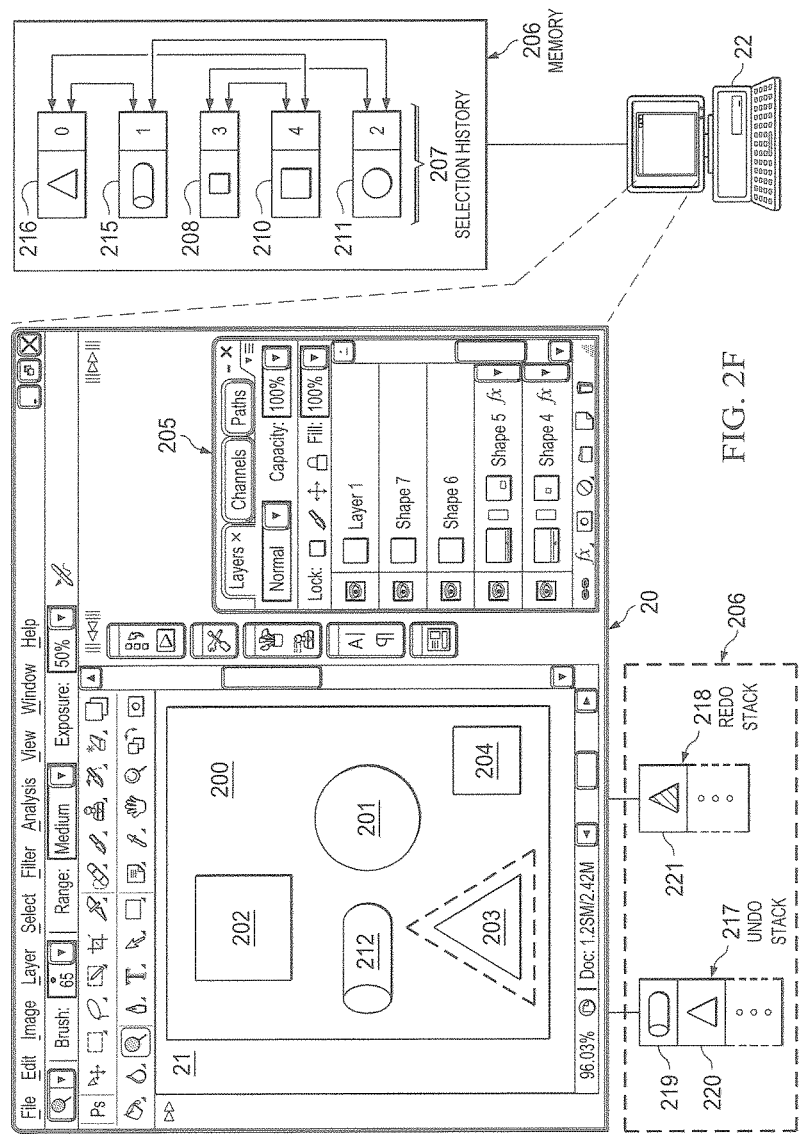

During the design process illustrated in FIG. 2F, the designer has decided to undo one of the edits that he or she has made along the process. GPA 20 also includes access to undo stack 217 and redo stack 218 which implement the typical functionality of asynchronous undo/redo edits. Asynchronous undo/redo edits records all edits in sequence up to some assigned memory limitations and then allows the designer to pull down the sequence list to choose which edit in the sequence the designer wishes to undo. This well known functionality allows designers to undo edits without having to undo each previous edit made after the edit desired for undoing. As each edit occurs, the previous version of the edited content is saved in undo stack 217. For example, undo stack 217 includes undo 219, which is the previous version of object 212 at its original location, and undo 220, which is the still previous version of object 203.

In FIG. 2F, the designer selects undo 220 to restore the original version of object 203 to document 200. Upon selection of undo 220, the previous version of object 203 is placed onto design canvas 21 in document 200 and redo 221, which is the edited version of object 203, is placed into redo stack 218. In response to the original version being placed, selection history 207 deletes selection entry 214 (FIG. 2E) and adds new selection entry 216 with the "new" object information which corresponds to the previous version of object 203. Selection history 207 then writes sequence indicator '0' to selection entry 216 to reflect that it is the currently selected object and then updates the linking between selection entries 208, 210-211, and 215-216 to reflect the deletion of entry 214 (FIG. 2E).

Figure 2G:
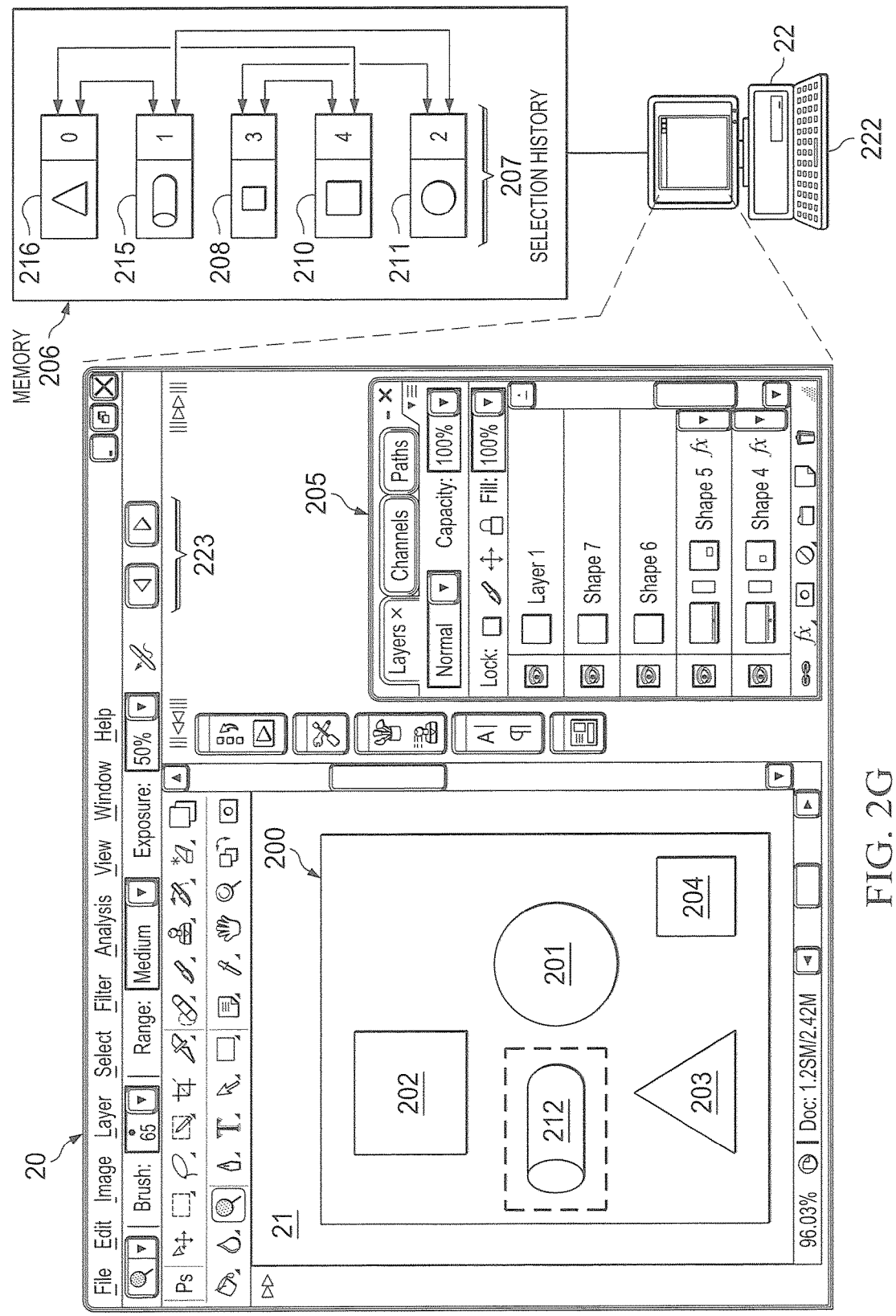

During the design process of the embodiment illustrated in FIGS. 2A-2F, the process of building selection history 207 has been described. However, one of the benefits available to users is the ability to use selection history 207 to traverse through a series of selections quickly, without the necessity of making selections from layers panel 205, scrolling through a document, or trying to pick out the desired object on a design view canvas which have been selected before by the user. In FIG. 2G, the designer traverses selection history 207 by activating a traversal input. A traversal input may be input provided by a hot key combination from keyboard 222, an interface selector, such as traversal keys 223, or the like. The designer enters the hot key combination on keyboard 222 to traverse back to the previous selection. In response to receiving this input signal, GPA 20 changes the currently selected object in document 200 to the object corresponding to the selection entry that is one step higher in the selection sequence. Using the document information in this selection entry, GPA 20 can display the appropriate object in its selected state. Thus, in moving selections from object 203 in FIG. 2F, selection entry 215 is chosen, having the sequence indicator '1', which uses the object information to move the current selection to object 212 on document 200.

It should be noted that when the designer changes the current selection by traversing selection history 207, the sequence of selection history 207 is not, in fact, changed. All other actions that change selection of the objects on document 200, however, do change selection history 207.

Figure 2H:
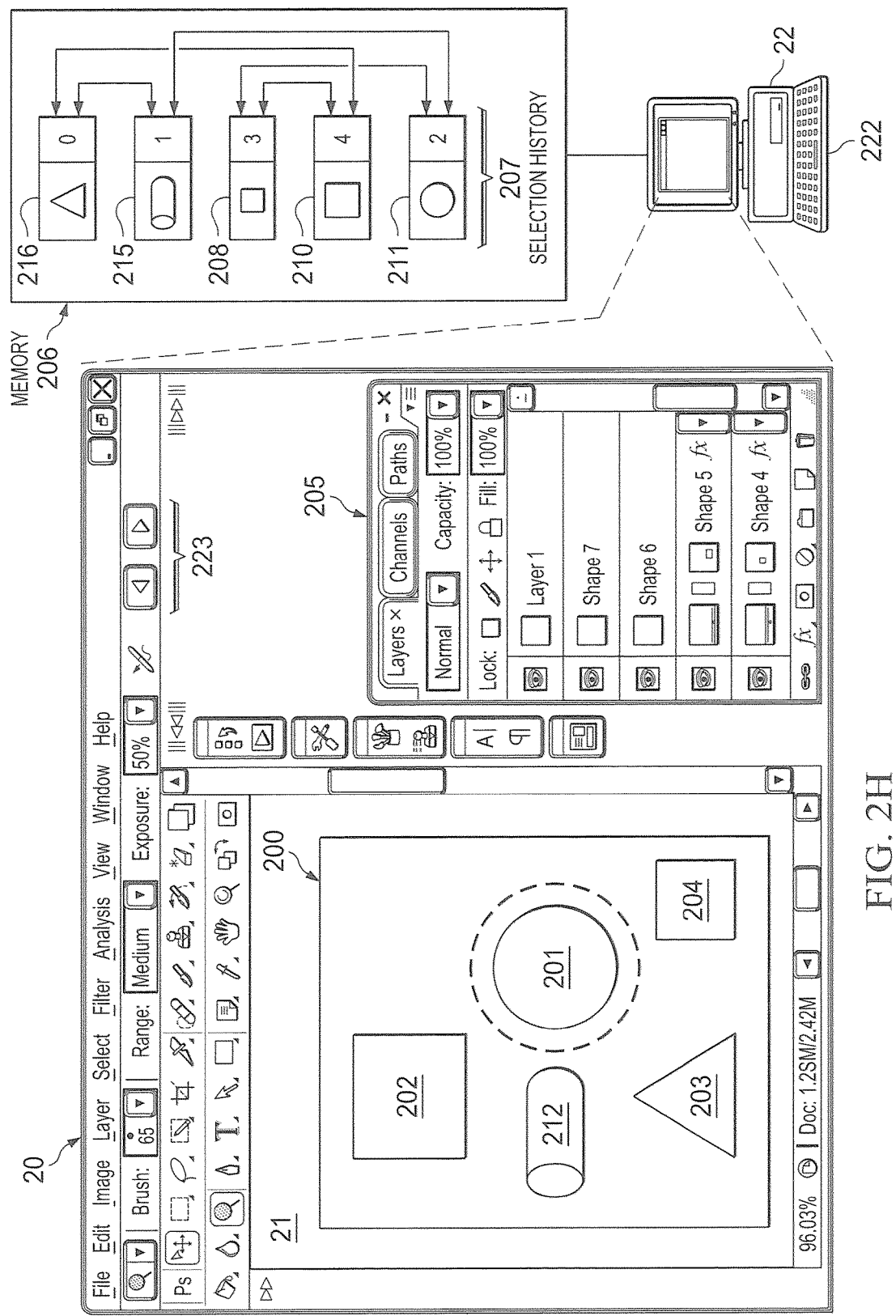
Figure 2I:
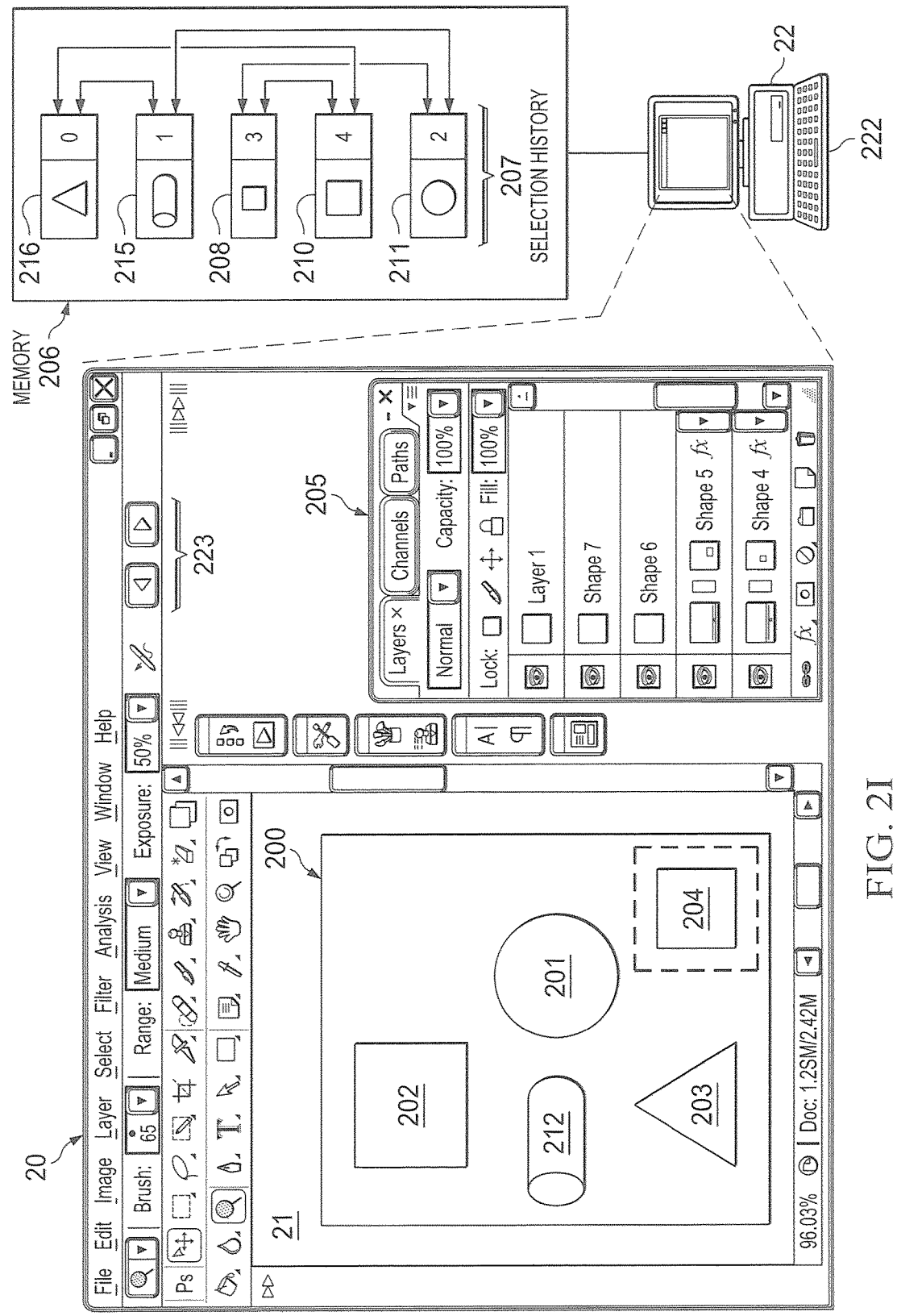

The designer selects the reverse interface of traversal keys 223 in FIG. 2H and further traverses back through selection history 207 to change the current selection on document 200 to object 201. GPA 20 uses the object information in selection entry 211, which corresponds to object 201, and is identified with sequence indicator '2' indicating it is next in the line of selections.

In FIG. 2I, the designer again provides traversal input either through keyboard 222 or traversal keys 223 to change selections to object 204. GPA 20 moves up to the selection entry identified with sequence indicator '3', selection entry 208, and uses the object information stored at selection entry 208 to change the current traversal selection to object 204. Again, no changes occur to the sequence or content of selection history 207, because the designer is using the traversal input to simply traverse selection history 207 to change the current traversal selection.

Figure 2J:
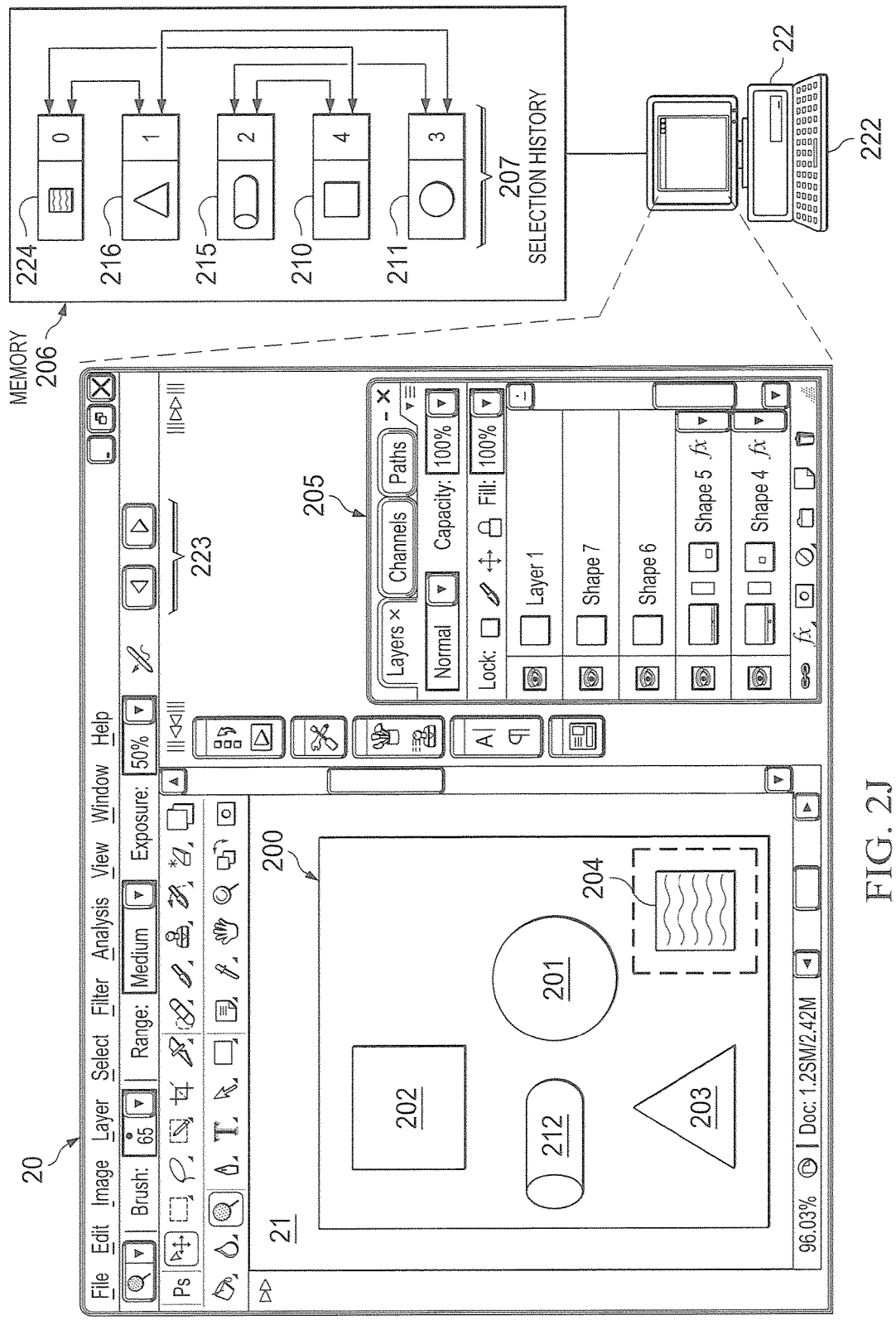

With object 204 now the current selection, the designer modifies object 204 by placing a graphical texture on it, as illustrated in FIG. 2J. The current selection is maintained with object 204, however, as a modification has now occurred, selection history deletes selection entry 208 and adds new object information to selection entry 224 with a sequence indicator of '0' to represent the current selection of the newly modified object 204. Thus, by providing a simple means for the designer to traverse between selections, the designer may easily traverse object selections within various document layers or portions of the document without the need to scroll within layers panel 205 in order to find the appropriate layer and then object.

Figure 2K:
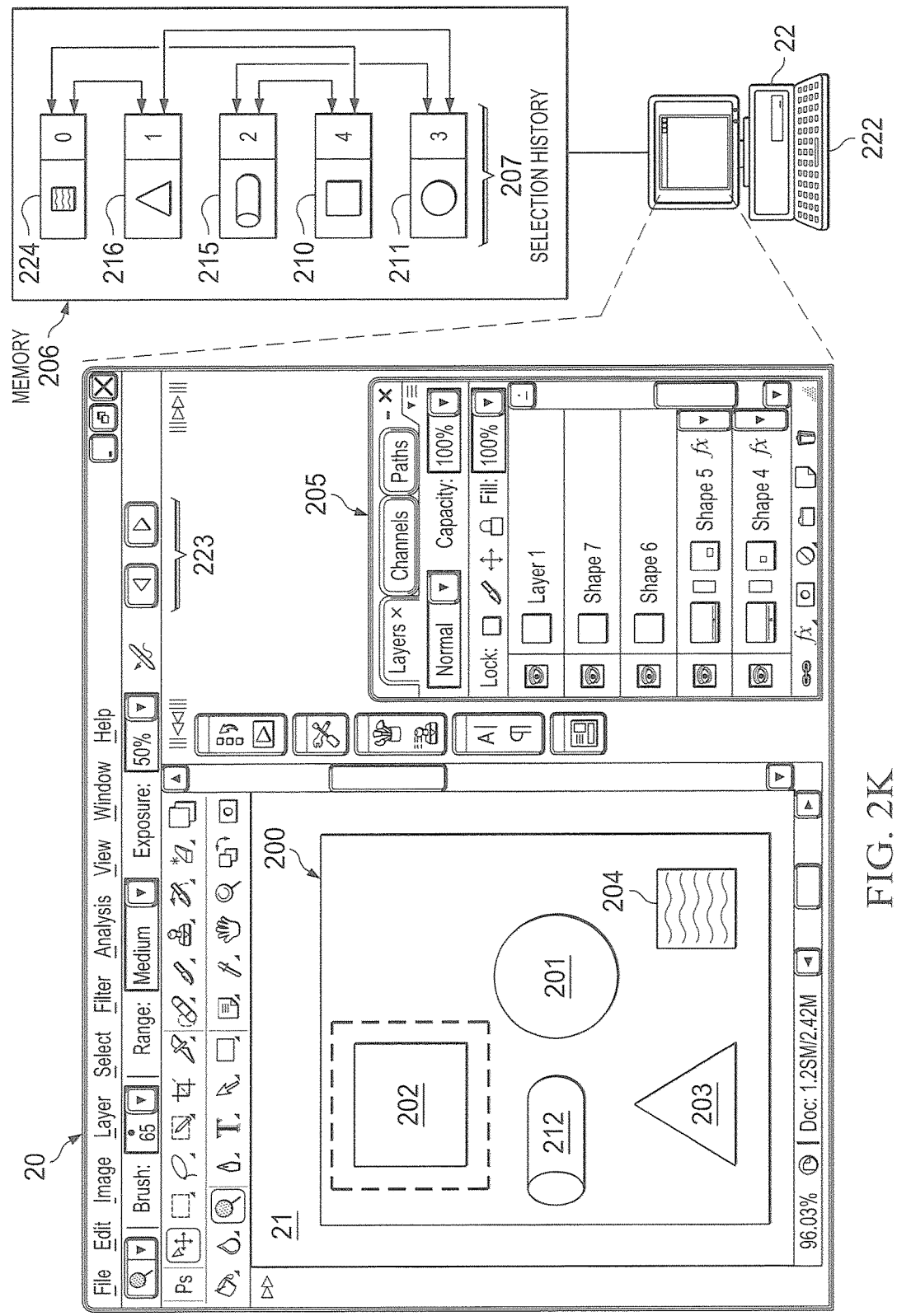

In addition to traversing sequentially through selection history 207 in a "reverse" direction, the user may take advantage of the circular nature of selection history 207 by traversing in an opposite direction. In FIG. 2K, the user selects the reverse one of traversal keys 223 or selects the reverse key combination through keyboard 222. In response, instead of moving the current traversal selection to selection entry 216, which is the next adjacent selection in the reverse direction from the current selection entry, selection entry 224, the current traversal selection is set to selection entry 210, which is the last selection entry within selection history 207, and, thus, connected to the current selection, selection entry 224. Therefore, when traversing in the forward direction, object 202 is highlighted as the current traversal selection.

It should be noted that while the terms "forward" and "reverse" have been used in describing a direction to traverse selection history 207, these descriptive terms are merely relative. The various embodiments are capable of traversing selection history 207 in either direction, regardless of how the relative term is used to describe it.

Figure 3A:
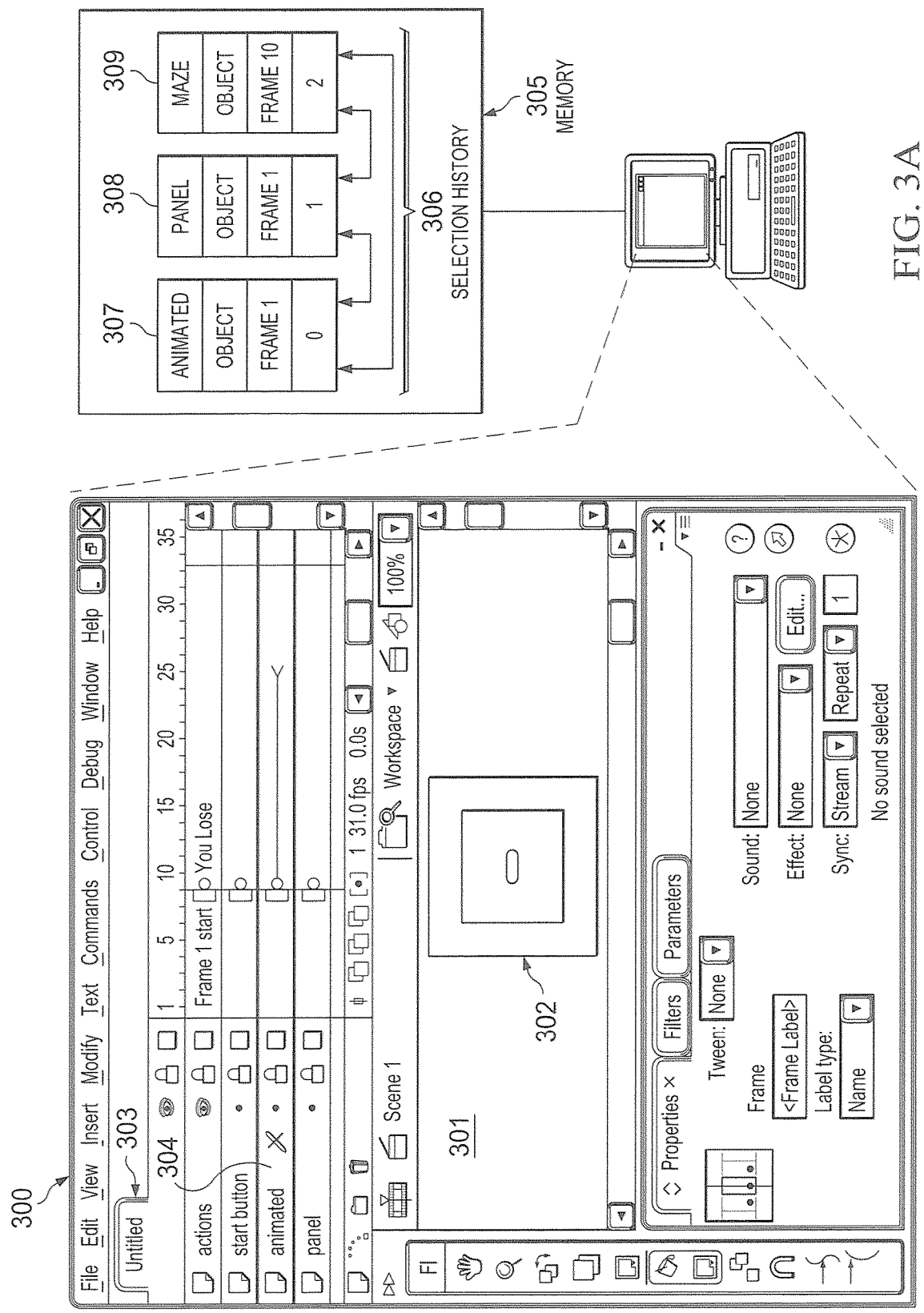
FIGS. 3A-B are block diagrams illustrating a multimedia productivity application configured according to one embodiment of the present disclosure.
Figure 3B:
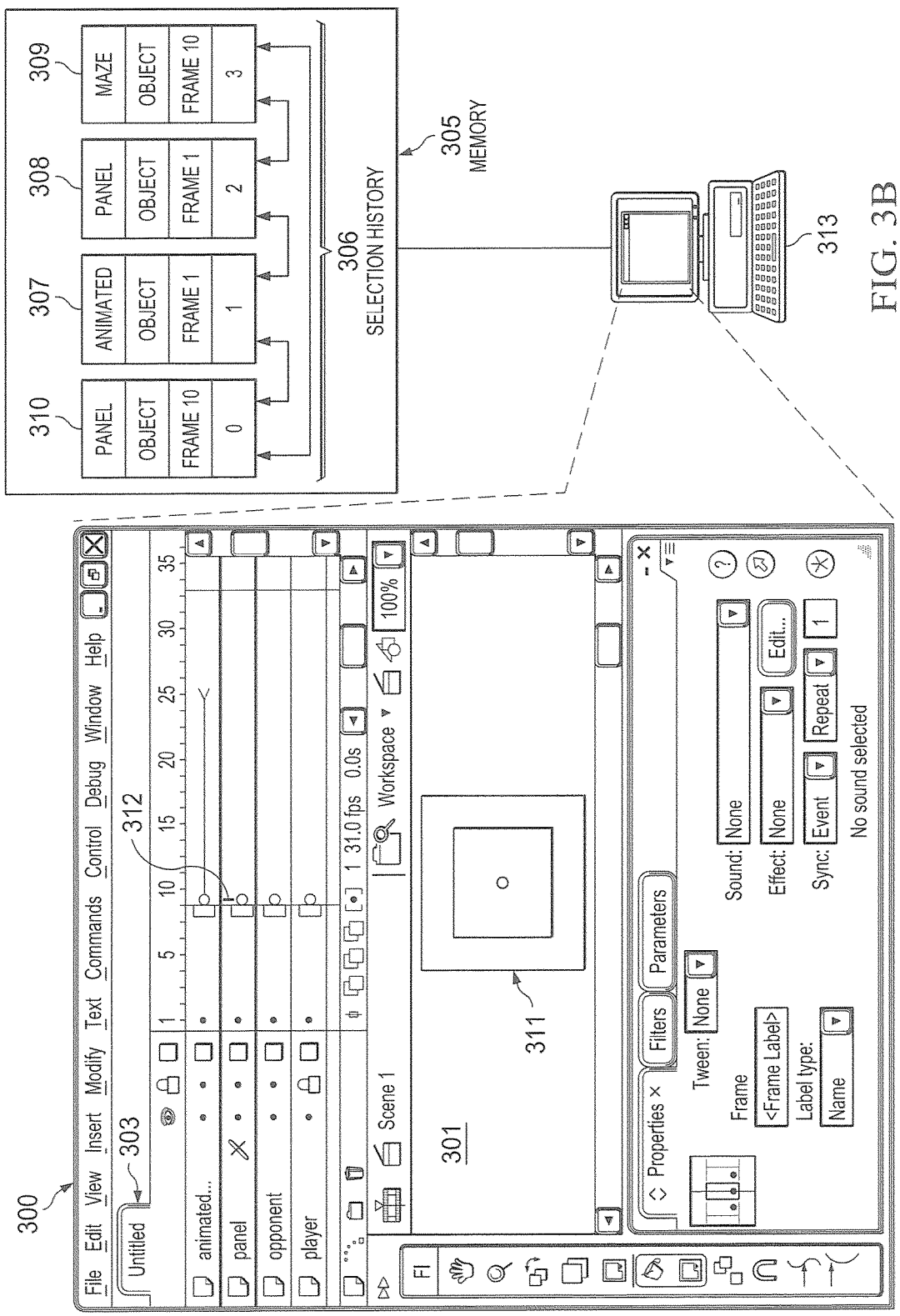

Additional and/or alternative embodiments may be implemented in productivity applications which utilize timelines. FIGS. 3A-B are block diagrams illustrating multimedia productivity application (MPA) 30 configured according to one embodiment of the present disclosure. MPA 30 operates in a computer environment (not shown) having memory 305. In contrast to GPA 20 (FIGS. 2A-2J), MPA 30 includes timeline 303, which provides another dimension in which developers may operate in MPA 30. In the stage of development illustrated in FIG. 3A, the developer has created object 302 on design canvas 301. Selection history 306 reflects the current sequence of selections the developer has made to this point. Selection history 306 includes selection entries 307-309 each having object information which includes the layer and object reference, identification of the particular frame within timeline 303 for that particular layer and object reference. Selection entries 307-309 also include the sequence identifier, which identifies the current selection, with an identifier of '0', or the sequence of the other selections within selection history 306. Thus, the currently selected object is object 302 on layer 304 (labeled "animated") of frame 1, which corresponds to selection entry 307.

It should be noted that, for the sake of convenience, the illustration of selection history 306 reflects "Obj" to represent the object information other than the frame and layer of the particular object.

The developer moves the current selection to the Panel layer in frame 10 of timeline 303. As depicted in FIG. 3B, selection entry 310 is added to selection history 306 along with its corresponding object information and indicating the new current identifier '0'. The remaining selection entries, selection entries 307-309, are then re-ordered. The developer then activates a hot key combination on keyboard 313 to traverse back through the selection history. With the first key strike, the current selection is switched back to object 302 on the animated layer 304 of frame 1, as reflected in selection entry 307 having an identifier of '1.' As the user again strikes the hot key combination on keyboard 313, the current selection is switched back to the panel layer, but this time, because the object information in selection entry 308 reflects a different location within the panel layer, it selects an object on frame 1 of the panel layer instead of the previous "selection" on frame 10. Thus, the user is able to traverse not only from layer to layer and object to object, but also between frames in timeline 303.

Figure 4A:
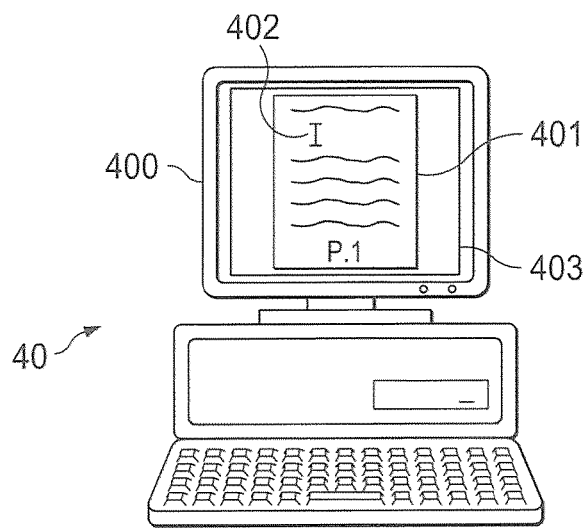
FIGS. 4A-4C are diagrams illustrating a word processing application configured according to one embodiment of the present disclosure.
Figure 4B:
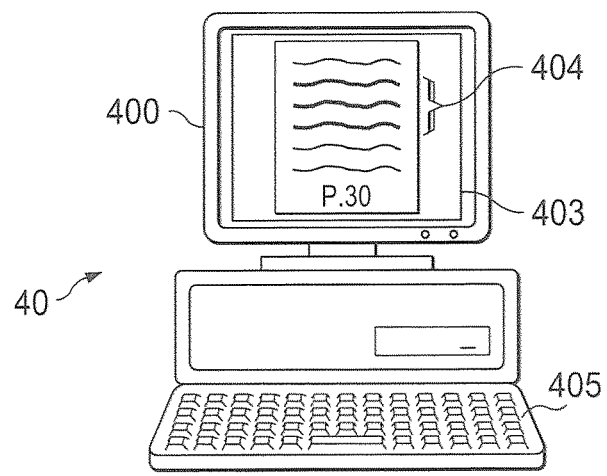
Figure 4C:
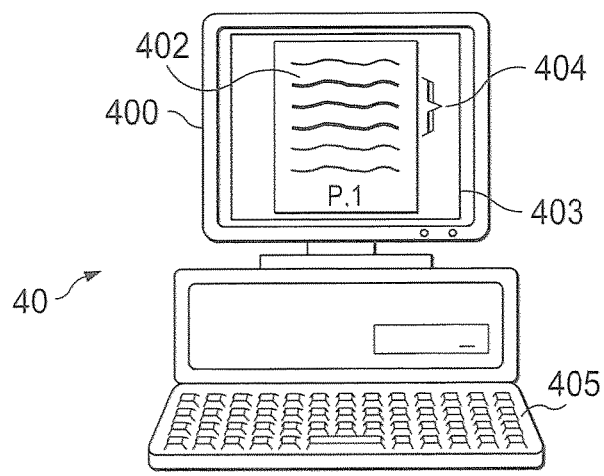

While GPAs and MPAs often deal with documents having multiple layers, multiple frames in a timeline, and the like, many common productivity applications also find benefit of additional and/or alternative embodiments of the present disclosure. FIGS. 4A-4C are diagrams illustrating word processing application (WPA) 403 configured according to one embodiment of the present disclosure. WPA 403 operates on computer system 40 with a page (page 1) of document 401 displayed on computer display 400. The author is facing a situation in which he or she wishes to copy several sentences from locations further down in document 401 and place them in a bullet list on page 1 at insertion point 402. With the cursor at insertion point 402, the current selection entry in the selection history list (not shown) includes object information representative of insertion point 402.

The author then scrolls down through document 401 until he or she reaches page 30, as shown in FIG. 4B. On page 30, the author highlights text segment 403 and copies it into the clipboard of WPA 403. By placing the cursor on page 30 to highlight text segment 403, the author changes the current selection to the location in document 401 of text segment 403. Thus, the current selection in the selection history is changed to this location at page 30 along with the corresponding object information reflecting the selection of text segment 403 on page 30 while the previous selection is now identified as insertion point 402 on page 1. After copying text segment 403, instead of having to scroll back through the document, the author simply selects the appropriate key combination on keyboard 405 to traverse back through the selection history. In response to this key selection, WPA 403 uses the object information from the previous selection entry to jump back to the previous selection entry at insertion point 402 of page 1. Because the author is now at the exact point desired for insertion of text segment 403, he or she pastes text segment 403 at insertion point 402. Thus, by utilizing selection history, the author is relieved of the time it takes to scroll back and forth within document 401.

Figure 5:
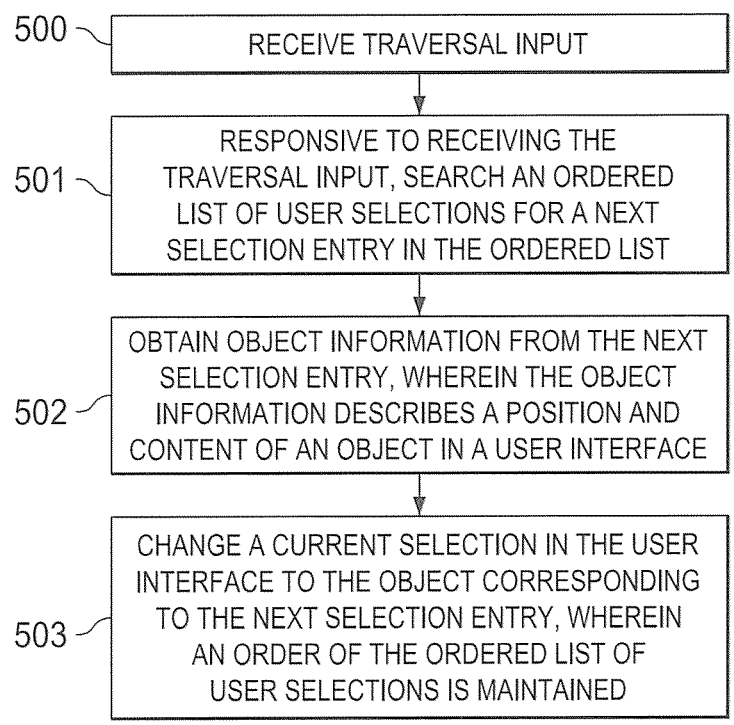
FIG. 5 is a flowchart illustrating example steps executed to implement one embodiment of the present disclosure.

FIG. 5 is a flowchart illustrating example steps executed to implement one embodiment of the present disclosure. In step 500, traversal input is received at a productivity application. Responsive to receiving the traversal input, an ordered list of user selections is searched, in step 501, for a next selection entry in the ordered list. Object information is obtained from the next selection entry, in step 502, wherein the object information describes a position and content of an object in a user interface of the productivity application. In step 503, a current selection in the user interface is changed to the object corresponding to the next selection entry, while an order of the ordered list of user selections is maintained.

FIGS. 6A-6D are diagrams illustrating graphical productivity application (GPA) 60 configured according to one embodiment of the present disclosure. GPA 60 operates on computer system 62 providing a productivity environment for users to develop graphics or graphical applications. Computer system 62 provides memory 612, keyboard 61, and computer display 63. GPA 60 is configured with a selection history feature that utilizes selection history list 613 in a similar fashion to GPA 20 (FIGS. 2A-2K), MPA 30 (FIGS. 3A-3B), and WPA 403 (FIGS. 4A-4C). GPA 60 is configured to allow multiple object selections. Selection entry 614 is shown to contain object information for a multiple object selection of objects 601-603. In normal operation, before objects 601-603 would be part of the multiple selection, they would have each been individually created. As the user creates each one, a corresponding entry would be made in selection history list 613. Selection entries 617-619 correspond to the creation of each of objects 601-603. Selection entry 614 is, thus, a new entry that includes the object information for each object within the multiple selection. Object 604 is illustrated as the current selection in GPA 60, as indicated by the dotted lines. The current selection corresponds to selection entry 615 in selection history list 613, which has a selection indictor of '0' also representative of the current selection.

GPA 60 also includes selection panel 608. Selection panel 608 provides a list of each of the selections maintained in selection history list 613. As illustrated, each selection panel entry, selection panel entries 609-611, includes a representative graphic and an indication of the order of the selections. In addition to key combinations on keyboard 61 and traversal keys 606 and 607 that a user may enter to traverse selection history list 613, the user may also make a selection directly from selection panel 608. By selecting any of selection panel entries 609-611, the user can change the current traversal selection.

Figure 6A:
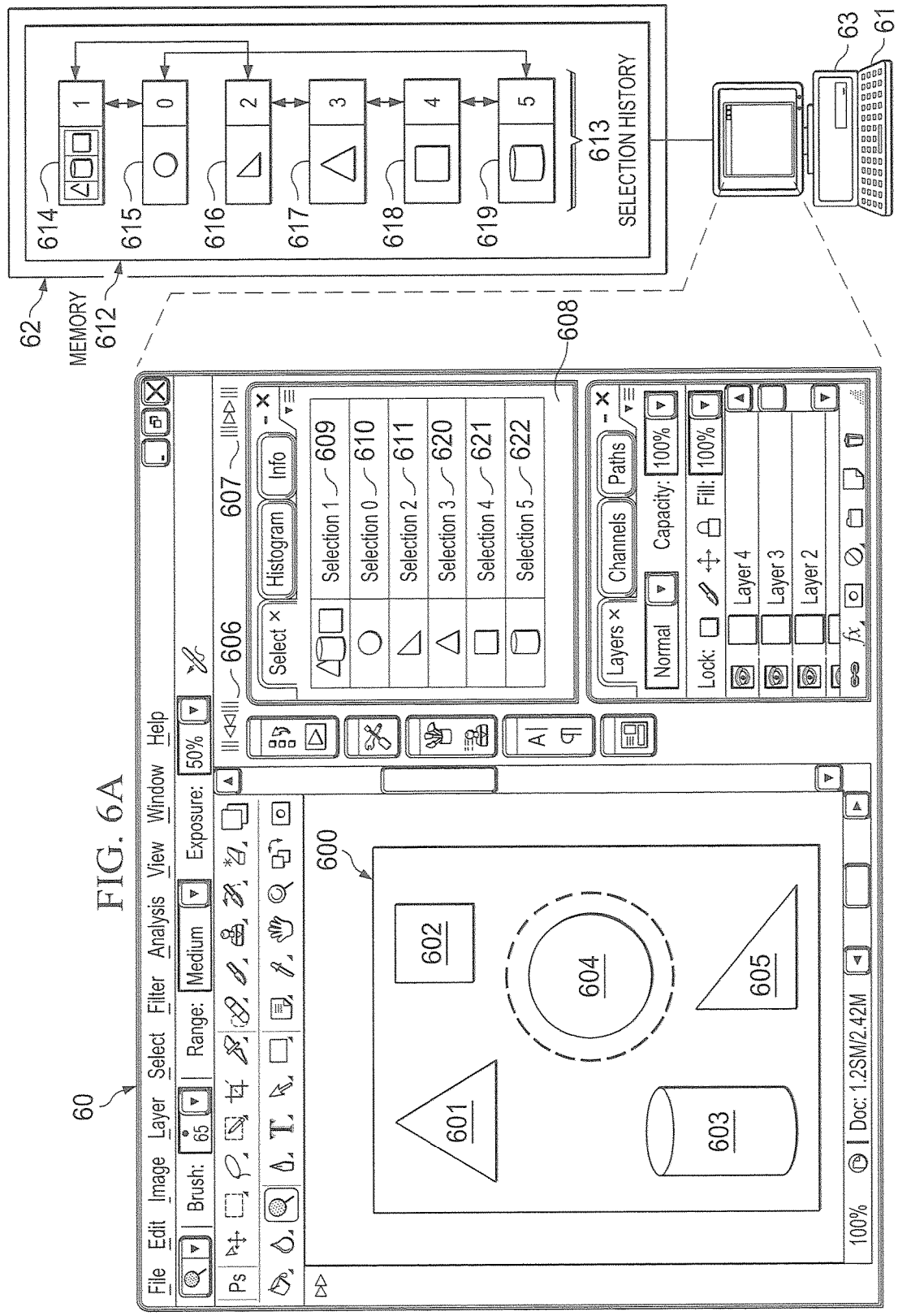
Figure 6B:
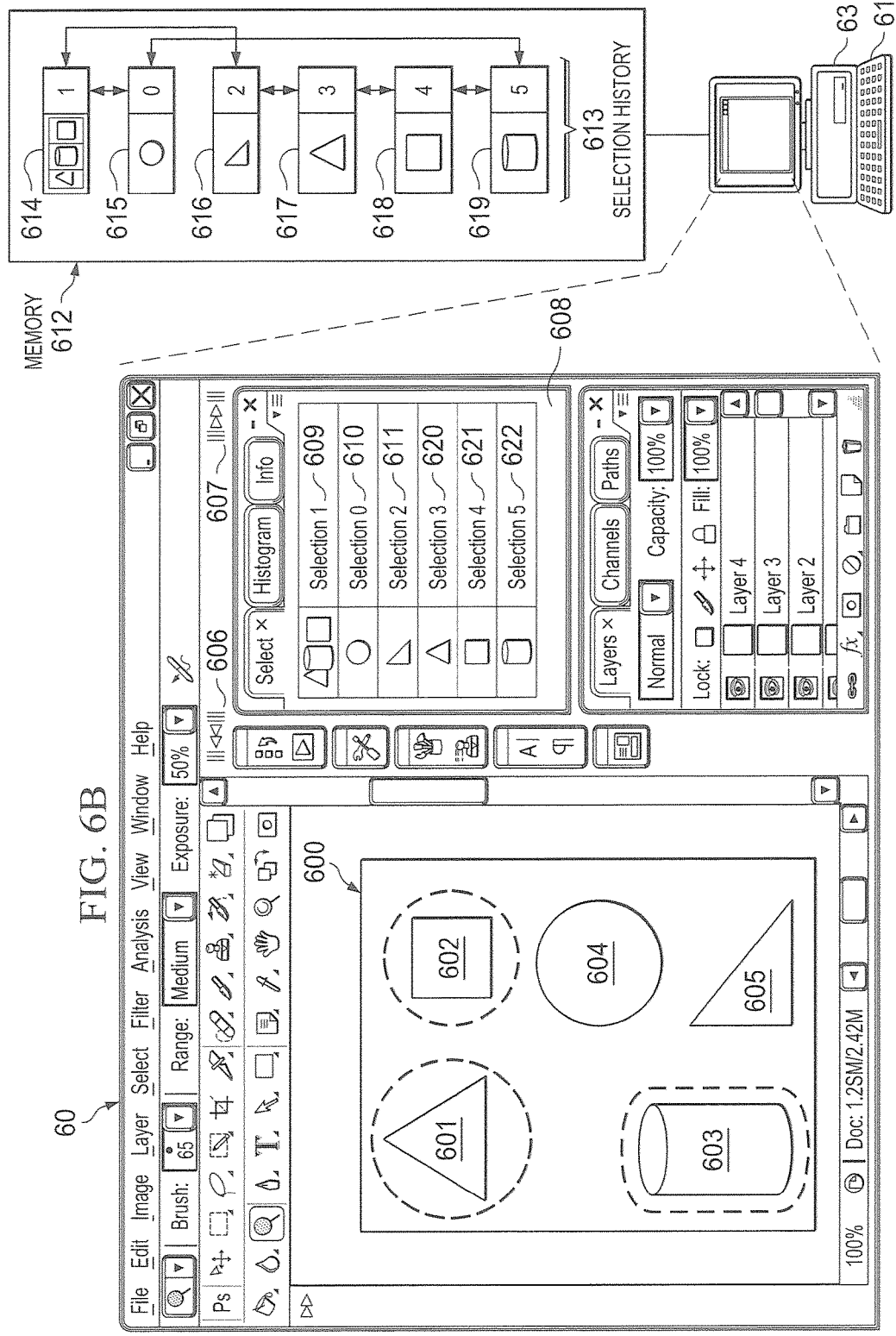

As the user decides to traverse selection history list 613, he or she selects selection panel entry 609 representing the multiple selection the user previously made. In response to selection of selection panel entry 609, the current traversal selection is changed, as illustrated in FIG. 6B, to reflect a multiple selection consisting of objects 601-603.

Figure 6C:
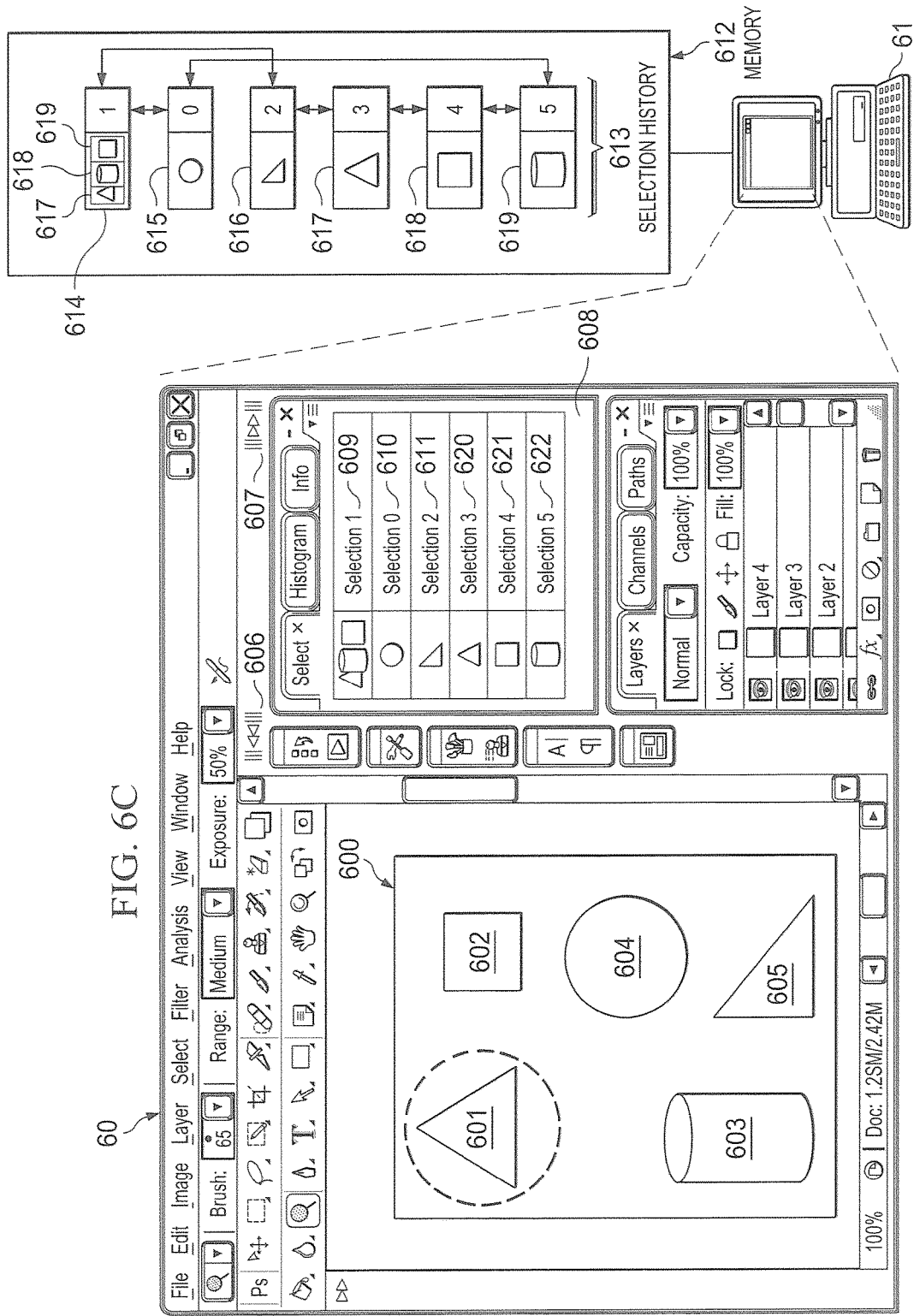

In additional and/or alternative embodiments of the present disclosure, multiple selections may be treated differently. As illustrated in FIG. 6C, as the user selects selection panel entry 609 from selection panel 608, the current active selection is changed to object 601 as the current traversal selection. In order to deal with multiple selections, this alternative embodiment keeps track of the order in which the objects in the multiple selection were added. Selection entry 614 of selection history list 613 includes separate object information entries, object information entries 617-619, which identify the order each object was added to the corresponding multiple selection. Therefore, in response to the user selecting selection panel entry 609, GPA 60 obtains the object information for object 601, which corresponds to object information entry 617. Using that object information, the current active selection is changed to object 601.

In order to traverse further through the multiple selection, the user may select selection panel entry 609 again, activate traversal key 607, or enter the key combination corresponding to the reverse traversal command. In response to receiving this further traversal command, the object information from object information entry 618 is retrieved corresponding to object 603, which was the second object added to the multiple selection. As illustrated in FIG. 6D, the current active selection is changed now to object 603.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

FIG. 7 illustrates an exemplary computer system 700 which may be employed to implement productivity application with selection history features and/or one or more of the client computing devices according to certain embodiments. Thus, various productivity applications such as GPA 20 (FIGS. 2A-2J), MPA 30 (FIGS. 3A-3B), and WPA 40 (FIGS. 4A-4B) having selection history features may be implemented on such exemplary computer system 700 according to one embodiment. Central processing unit (CPU) 701 is coupled to system bus 702. CPU 701 may be any general-purpose CPU. The present disclosure is not restricted by the architecture of CPU 701 (or other components of exemplary system 700) as long as CPU 701 (and other components of system 700) supports the inventive operations as described herein. CPU 701 may execute the various logical instructions described herein. For example, CPU 701 may execute machine-level instructions according to the exemplary operational flow described above in conjunction with FIG. 5.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as interacting with a user interface provided by a given virtual space being accessed by the user, as described above.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for operations of the selection history features. Communications adapter 711 is preferably adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display a presence interface and/or other information desired to be displayed, as discussed herein.

It shall be appreciated that the present disclosure is not limited to the architecture of system 700. For example, any suitable processor-based device may be utilized for implementing selection history features and/or client computing devices, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present embodiments, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

What is claimed is:

1. A method comprising:
   receiving traversal input;
   responsive to receiving the traversal input, searching an ordered list of selections for a next selection entry in the ordered list, wherein each selection entry identifies a respective object that was previously selected in a graphical interface and wherein each selection entry identifies only a selection of the respective object;
   obtaining object information from the next selection entry, wherein the object information describes a position and content of at least object the graphical interface; and
   changing a current selection in the graphical interface to the at least one object corresponding to the next selection entry, wherein an order of the ordered list of selections is maintained, wherein the current selection comprises a visual indicator indicating an object selection in the graphical interface, wherein changing the current selection comprises rendering the visual indicator at the position or with the content described in the object information.

2. The method of claim 1 wherein the ordered list of selections comprises:
   two or more selection entries arranged in order of selection of the at least one object by a user.

3. The method of claim 2 wherein each of the two or more selection entries comprises:
   an object information entry corresponding to an associated selected at least one object; and
   a sequence indicator identifying a position in the order of selection.

4. The method of claim 1 further comprising:
   receiving input specifying an action performed on the at least one object; and
   re-ordering the ordered list of selections to place the at least one object in a first position of the ordered list.

5. The method of claim 4 wherein the action comprises one of:
   a selection;
   a transformation action indicating a modification of a position of the at least one object as rendered on the graphical interface; or
   an edit signal indicating a modification of the at least one object as stored in a memory device.

6. The method of claim 5 further comprising:
   responsive to receiving the edit signal, deleting a previous selection entry corresponding to the at least one object;
   storing new object information corresponding to the modified at least one object in a new selection entry in the ordered list of selections; and
   setting a sequence indicator of the new selection entry to indicate the first position.

7. The method of claim 1 further comprising:
   receiving an undo signal, wherein the undo signal relates to an object on the graphical interface;
   responsive to receiving the undo signal:
      replacing the object with an undone object from an undo stack, wherein the undo stack is different from the selection history list; and
      deleting a selection entry in the ordered list of selections relating to the object;
   storing undo object information relating to the undone object in a new selection entry in the ordered list of selections; and
   setting a sequence indicator of the new selection entry to reflect a first position in the ordered list of selections.

8. The method of claim 1 wherein the current selection comprises a multiple selection of two or more of the at least one object.

9. The method of claim 1 wherein the current selection comprises a most recently selected object of a multiple selection of two or more of the at least one object when the object information describes the position and the content of two or more of the at least one object.

10. The method of claim 1 further comprising:
generating a selection history panel for display on the graphical interface, wherein the selection history panel displays the ordered list of selections.

11. The method of claim 10 wherein the traversal input comprises selection of an entry of the ordered list of selections displayed on the selection history panel.

12. The method of claim 1 further comprising:
determining a traversal direction of the traversal input, wherein the traversal direction controls the direction of selections to search for the next selection entry.

13. The method of claim 1, wherein changing the current selection to the at least one object is performed without modifying the at least one object.

14. The method of claim 1, wherein searching the ordered list in response to the traversal input is performed without causing a change to the graphical interface other than changing the current selection in the graphical interface.

15. The method of claim 1, wherein searching the ordered list comprises traversing from a selection entry corresponding to a first selection in a first layer rendered in the graphical interface to the next selection entry corresponding to a second selection in a second layer rendered in the graphical interface.

16. The method of claim 1, wherein each selection entry identifies a selection of the respective object in the graphical interface, the selection identifying the respective object for selection-specific functions the selection entry identifying the selection distinct from any selection-specific functions.

17. The method of claim 1, wherein each selection entry identifies a selection of the respective object without identifying editing of the respective object.

18. The method of claim 1, wherein searching the ordered list in response to the traversal input is performed without causing a change to the respective object.

* * * * *